United States Patent [19]

Mese et al.

[11] Patent Number: 5,396,443
[45] Date of Patent: Mar. 7, 1995

[54] INFORMATION PROCESSING APPARATUS INCLUDING ARRANGEMENTS FOR ACTIVATION TO AND DEACTIVATION FROM A POWER-SAVING STATE

[75] Inventors: Michihiro Mese, Chigasaki; Toshio Kamimura, Fujisawa; Shigeto Oeda, Kamakura; Hitoshi Yonenaga, Hitachi, all of Japan

[73] Assignee: Hitachi, Ltd., Tokyo, Japan

[21] Appl. No.: 133,221

[22] Filed: Oct. 7, 1993

[30] Foreign Application Priority Data

Oct. 7, 1992 [JP] Japan ................................. 4-268417

[51] Int. Cl.6 .............................................. G06F 1/32
[52] U.S. Cl. ................................................ 364/707
[58] Field of Search ......................................... 364/707

[56] References Cited

U.S. PATENT DOCUMENTS

| 3,922,526 | 11/1975 | Cochran | 364/707 |
| 4,409,665 | 10/1983 | Tubbs | 364/707 |
| 4,649,373 | 3/1987 | Bland et al. | 364/707 |
| 5,065,357 | 11/1991 | Shiraishi et al. | 364/707 |

FOREIGN PATENT DOCUMENTS 1-271796 10/1989 Japan .

OTHER PUBLICATIONS

Ejiri et al, "A Process For Detecting Defects in Complicated Patterns" *Computer Graphics & Image Processing* 1973 pp. 326–334.
Glass, "Power Management" *Byte* Sep. 1991 pp. 329–335.

*Primary Examiner*—David H. Malzahn
*Attorney, Agent, or Firm*—Antonelli, Terry, Stout & Kraus

[57] ABSTRACT

An information processing apparatus can save an electric power when it is not in use and can be made active immediately after an operation medium such as a pen and a finger or the user approaches or comes in contact with the apparatus, the arrangement being such that a housing portion of the apparatus includes therein a sensor for detecting the approach or contact of a user operation medium or user and a state display unit for informing the user that the apparatus is in the active state or in the standby state, a power saving control unit controls a controlled object concerning a power consumption in response to the approach, contact or separation of the operation medium or user, and a timer included in the electric power saving control unit determines whether or not the operation medium or user is separate from the apparatus.

29 Claims, 10 Drawing Sheets

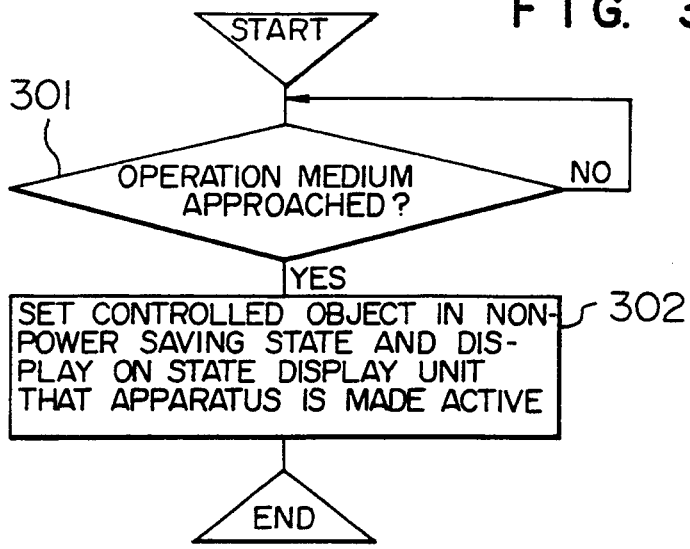
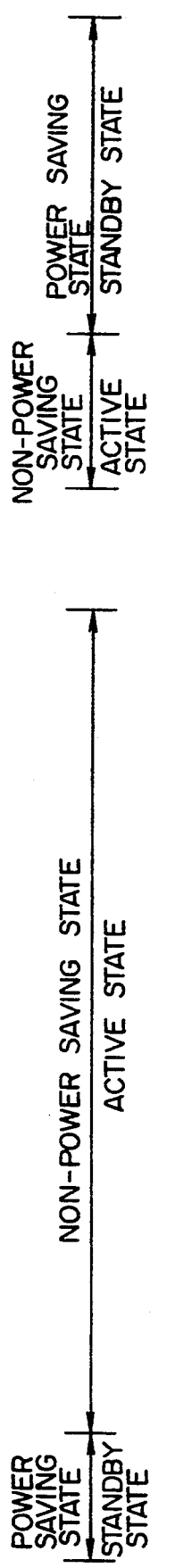
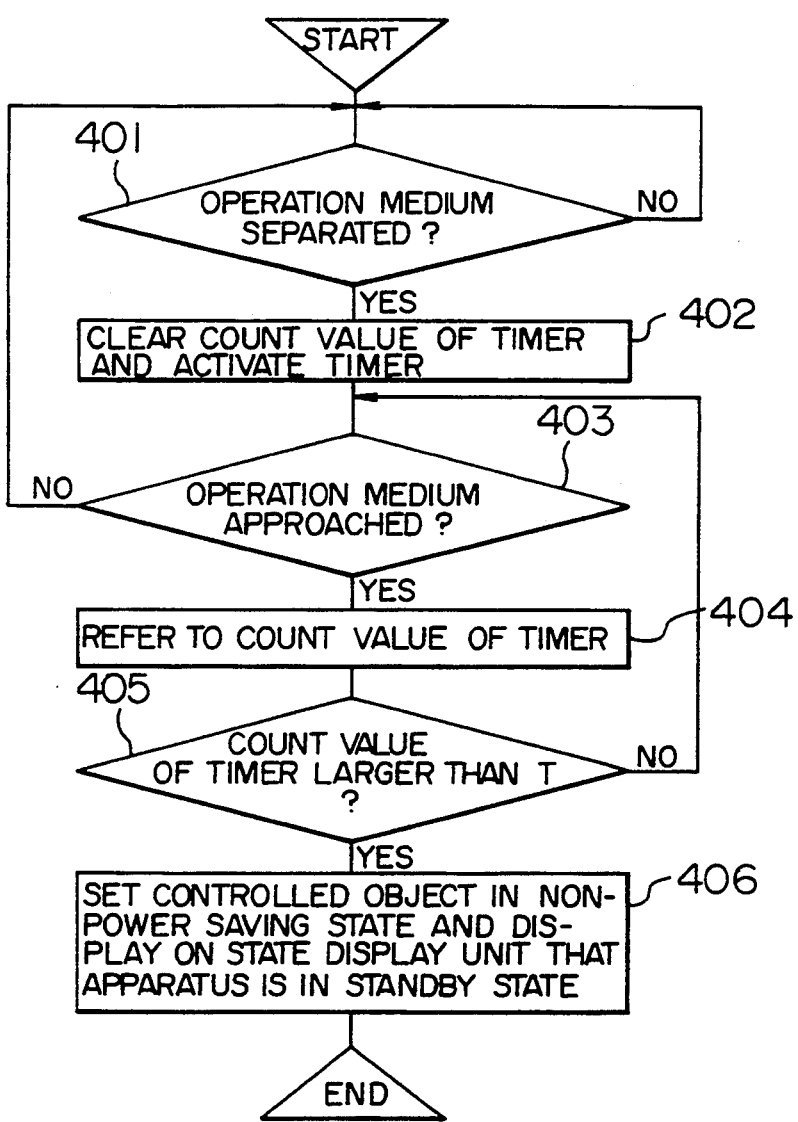

F I G. 10
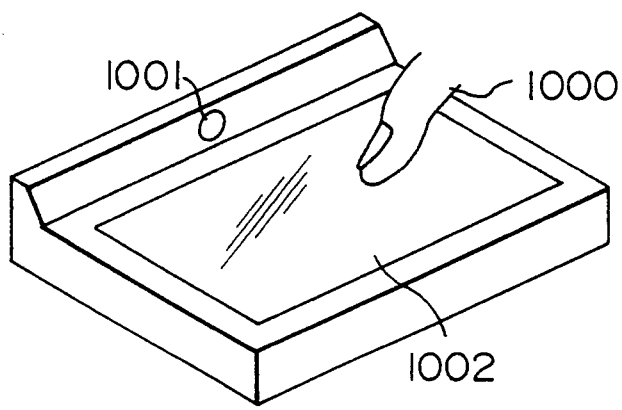
F I G. 11
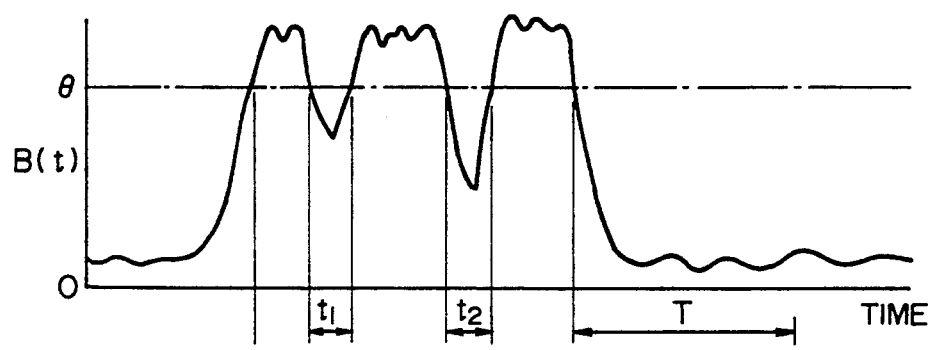
| SITUATION OF OPERATION MEDIUM | SEPA-RATION | APPROACH | CONTACT, APPROACH OR SHORT-TIME SEPARATION (APPARATUS IS BEING OPERATED) | LONG-TIME SEPARATION |
|---|---|---|---|---|
| STATE OF CONTROLLED OBJECT | POWER SAVING STATE | NON-POWER SAVING STATE | | POWER SAVING STATE |
| CONTENT OF STATE DISPLAY | STANDBY STATE | ACTIVE STATE | | STANDBY STATE |

INFORMATION PROCESSING APPARATUS INCLUDING ARRANGEMENTS FOR ACTIVATION TO AND DEACTIVATION FROM A POWER-SAVING STATE

BACKGROUND OF THE INVENTION

The present invention relates to an information processing apparatus which is low in power consumption and high in operability. More particularly, this invention relates to information processing apparatuses such as personal computers and word processors that are operated via keyboards and to information processing apparatus of a wide variety of application fields of a pen-base personal computer, a pen-base word processor, an electronic calculator, a portable electronic note book, a handy terminal device, a console of a plant, a kiosk such as a vending machine, an ATM (automated teller machine) and a street information service apparatus or a household furniture such as a table having a touch-sensitive display unit, etc.

In order to save an electric power of a primary battery, a secondary battery or a solar battery of an electronic apparatus such as a portable personal computer, a word processor or the like, an electric power saving control operation such as a resume operation for interrupting the supply of the whole power after information necessary for continuing work had been saved in a nonvolatile memory has heretofore been carried out when a user operation medium such as a keyboard or a mouse is not in use for a long period of time. Further, as a technique for preventing a battery from being consumed uselessly, JP-A-1-271796, for example, describes such a technique where a quantity of light of a back light that illuminates a display screen of a liquid crystal display device is adjusted in accordance with a quantity of external light. This previously-proposed method is effective, to a certain extent, for electronic equipments such as a portable personal computer, a word processor or a pen-based electronic equipment having a liquid crystal display panel with a back light in saving an electric power and also in improving viewability of picture screen. This method, however, has no consideration of the situation that the user operates these electronic equipments. There is then the problem that, when the user has left his seat and the electronic equipment has not been in use during a long period of time, the battery thereof is consumed uselessly.

Further, according to the above-mentioned conventional methods, in electronic apparatus having no user operation medium such as a keyboard or a mouse and operated with a pen or fingers, for example, the operation situation of these operation media cannot be utilized as a power saving control information.

SUMMARY OF THE INVENTION

An object of the present invention is to solve the problem by effecting the electric power saving control that an electric power of a primary battery, a secondary battery or an AC power supply is uselessly consumed when the apparatus has not been in use during a long period of time.

Another object of the present invention is to provide an information processing apparatus of very high operability that can be made active immediately after a pen or finger approaches or comes in contact with the information processing apparatus.

To solve the aforesaid problems, the information processing apparatus of the present invention includes at least at its whole of or a part of a housing thereof a means for detecting the approach or contact of a user operation medium or a medium accompanying with the user (including user's body, etc.) and a control means for controlling a power consumption of the apparatus in response to the approach or contact situation of the user operation medium or the user accompanying medium. Also, the information processing apparatus of the present invention includes a state display means for informing the user that the information processing apparatus is made active or is set in the standby mode, if necessary.

The control means controls a controlled object concerning a power consumption within the apparatus such that, if the user operation medium or the user approaches an approach detecting means or comes in contact with a contact detecting means, then the controlled object is set in the non-power saving state or that, if the user operation medium is continuously made separate from the approach detecting means or the contact detecting means for a long period of time, then the whole of or a part of the controlled object is set in the power saving state. Alternatively, if necessary, the situation that the information processing apparatus is set in the standby mode or is in the active state is displayed on the state display means in response to the two states of the power saving state and the non-power saving state. Therefore, when the user leaves his seat for a long period of time while the information processing apparatus is still being powered, the information processing apparatus is automatically set in the standby mode, i.e., in the power saving state. Immediately after the operation medium such as the user's pen or finger approaches or comes in contact with the information processing apparatus, the information processing apparatus of the present invention can be made active.

BRIEF DESCRIPTION OF THE DRAWINGS

FIG. 3 is a flowchart according to the present invention and, to which references will be made in explaining the processing executed when a controlled object is switched from the power saving state to the non-power saving state;

FIG. 4 is a flowchart according to the present invention, and to which references will be made in explaining the processing executed when the controlled object is switched from the non-power saving state to the power saving state;

FIG. 10 is a perspective view showing a structure of an apparatus that detects the approach of the operation medium by utilizing image information according to the present invention;

FIG. 11 is a diagram showing a time relationship between a black pixel count value B(t) based on the situation of the approach of the operation medium and the states of the apparatus according to the present invention;

DESCRIPTION OF THE PREFERRED EMBODIMENTS

Embodiments of the present invention will hereinafter be described with reference to the drawings. Initially, an embodiment shown in FIG. 1 of the accompanying drawings will be described.

Figure 1:
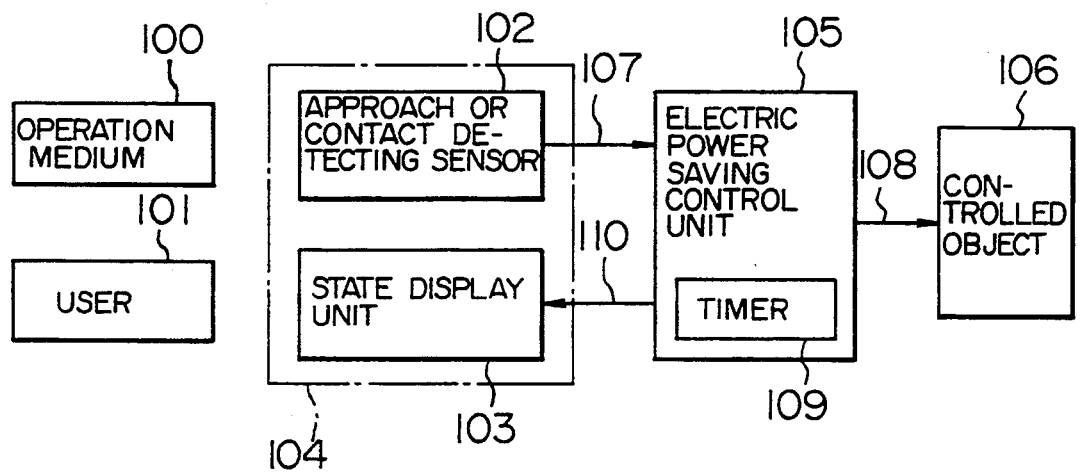
FIG. 1 is a schematic functional block diagram showing an arrangement of an information processing apparatus according to the present invention.

FIG. 1 is a schematic functional block diagram of an information processing apparatus according to the present invention, and illustrating an example that the information processing apparatus of the present invention is operated in response to the situations that an operation medium or user approaches or comes in contact with the apparatus. As shown in FIG. 1, there is provided an operation medium 100 such as a pen, a finger and so on. Also, there is provided a medium 101 which accompanies the user, such as a voice and so on. Unless otherwise specified, the operation medium 100 and the user 101 will be generally referred to as "operation media". There is provided a sensor 102 that detects whether the operation media 100, 101 approach or come in contact with the information processing apparatus. As the sensor 102, a tablet, an image sensor, a microphone or a temperature sensor etc. is available. A state display unit 103 is adapted to enable the user to know whether the information processing apparatus is being energized or set in the standby state. The sensor 102 and the state display unit 103 constitute a part of a housing unit 104. An electric power saving control unit 105 is adapted to control a controlled object 106 concerning a power consumption within the information processing apparatus in response to the situation that the operation media 100, 101 approach or come in contact with the information processing apparatus. The controlled object 106 might include a part of or whole of the sensor 102 and the state display unit 103, as will be described later on. If the operation media 100, 101 approach or come in contact with the sensor 102, then the electric power saving control unit 105 is actuated by a signal 107 and the controlled object 106 is placed in the non-power saving state by a signal 108. Simultaneously, the state display unit 103 is actuated by a signal 110 so as to display that the information processing apparatus is made active. As shown in FIG. 1, the electric power saving control unit 105 includes a timer 109 that counts a time period after the operation media 100, 101 has been away from the sensor 102. If the condition that the operation media 100, 101 had been away from the sensor 102 continues a predetermined time or more, then the controlled object 106 is wholly or partly set in the power saving state and the state that the information processing apparatus is placed in the standby mode is displayed on the state display unit 103. Although the state display unit 103 and the signal 110 are not indispensable elements of the present invention, high operability that will be described in the following embodiments can be realized by additionally providing the state display unit 103 and the signal 110.

Figure 2:
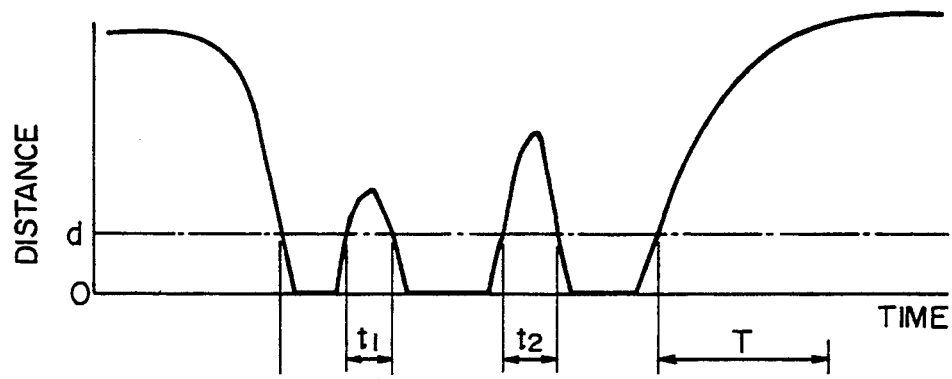
FIG. 2 is a diagram showing a time relationship between a distance of an operation medium or the like and the apparatus and the states of the apparatus.

FIG. 2 is a diagram showing a time relationship between the operation media 100, 101 and the distance of the information processing apparatus and the states of the information processing apparatus. Initially, when the operation media 100, 101 are sufficiently distant from the sensor 102, the controlled object 106 is in the power saving state and the situation that the information processing apparatus is in the standby mode is displayed on the state display unit 103. As shown in FIG. 2, when a distance between the operation media 100, 101 and the sensor 102 becomes less than the distance d, the controlled object 106 is placed in the non-power saving state and the situation that the information processing apparatus is energized is displayed on the state display unit 103. Even when the operation media 100, 101 are temporarily away from the distance d after the controlled object 106 had been set in the non-power saving state, if time periods $t_1$, $t_2$, for example, are shorter than a predetermined time T, then the non-power saving state is continued as shown in FIG. 2. It is customary that, when character strings are written with a pen, for example, the pen is detached from a tablet or the like in each stroke of character or between characters. In this case, if the non-power saving state is not retained in such a short period of time, then it is unavoidable that operability of the information processing apparatus is lowered considerably. Finally, after a sufficiently long period of time was passed since the operation media 100, 101 had been away from the distance d, the controlled object 106 is set again in the power saving state and the condition that the information processing apparatus is in the standby mode is displayed on the state display unit 103. Operation that the state of the information processing apparatus is detected when the operation media 100, 101 are brought in contact with the sensor 102 is a special case that the value of d in FIG. 2 is zero. The processing therefor is similar to those described above and therefore need not be described herein.

FIGS. 3 and 4 are flowcharts showing examples of the processing for effecting an electric power saving control and a state display control on the basis of the situation that the operation media approach the information processing apparatus.

FIG. 3 shows the processing that the operation media 100, 101 approach the information processing apparatus and the controlled object 106 is switched from the power saving state to the non-power saving state. In FIG. 3, the controlled object 106 is set in the power saving state initially. Referring to FIG. 3, following the start of operation, it is determined in decision step 301 whether or not the operation media 100, 101 approach the information processing apparatus. If the operation media 100, 101 do not approach the information processing apparatus yet as represented by a NO at decision step 301, then the decision step 301 is repeated until the operation media 100, 101 approach the information processing apparatus. If the operation media 100, 101 approach the information processing apparatus as represented by a YES at decision step 301, then the processing proceeds to the next step 302, whereat the controlled object 106 is set in the non-power saving state and the condition that the information processing apparatus is energized is displayed on the state display unit 103. Then, the processing is ended.

FIG. 4 shows the processing that the operation media 100, 101 go away from the information processing apparatus and the controlled object 106 is switched from the non-power saving state to the power saving state. Initially, the controlled object 106 is set in the non-power saving state. Referring to FIG. 4, following the start of operation, it is determined in decision step 401 whether or not the operation media 100, 101 are away from the information processing apparatus. If the operation media 100, 101 are away from the information processing apparatus as represented by a YES at decision step 401, then the processing proceeds to step 402, whereat a count value of the timer 109 is cleared to zero and then the timer 109 is activated to count. In the next decision step 403, it is determined whether or not the operation media 100, 101 approach the information processing apparatus. If the operation media 100, 101 are not close to the information processing apparatus as represented by a NO at decision step 403, then the processing returns to the decision step 401. If the operation media 100, 101 are approaching the information processing apparatus as represented by a YES at decision step 403, then the processing proceeds to step 404, whereat a count value of the timer 109 is measured. Then, it is judged in the next decision step 405 whether or not the count value of the timer 109 is larger than the predetermined value T. If the count value of the timer 109 is smaller than the predetermined value T as represented by a NO at decision step 405, then the decision step 403 is repeated. If on the other hand the count value of the timer 109 is larger than the predetermined value T as represented by a YES at decision step 405, then the processing proceeds to step 406, whereat the controlled object 106 is set in the power saving state and the condition that the information processing apparatus is in the standby mode is displayed on the state display unit 103. Then, the processing is ended. When the electric power saving control and the state display control are effected on the basis of the contact situation of the operation media 100, 101, "approach decision" in decision steps 301 in FIG. 3 and decision steps 401,403 is replaced with "contact decision". Hence, the same processing flowchart is provided and therefore need not be described herein.

Depending on the type and size of the information processing apparatus, such as the pocket type, the handy type, the portable type, the desktop type and the floor type, in order to avoid work and thinking of the user from being interrupted, it is preferable to set the predetermined value T necessary for monitoring the timer 109 in a range of from about several minutes to several tens of minutes similarly to those generally set in the electric power saving control operation when the keyboard is not operated. However, in the information service apparatus such as the kiosk or the like for providing information to many and unspecified persons, it is preferable that the information processing apparatus may not be set in the standby mode after about ten and several seconds but instead, the information processing apparatus may generate a message which urges the user to operate the apparatus or which becomes helpful for the user to operate the apparatus. Further, it becomes more convenient for the user that, if the predetermined value T can be set or updated when the user begins to use this information processing apparatus. Furthermore, it is preferable that the predetermined value T is not made constant and can be varied freely. By way of example, time periods $T_1, T_2, \ldots, T_n$ during which the operation media approach the information processing apparatus after the operation media had been away from the information processing apparatus and the controlled object had been set in the non-power saving state are measured in advance and the predetermined time T may be varied freely in response to, for example, the maximum value thereof, the average value thereof or histogram thereof. If the predetermined time T is extended in proportion to the maximum value, for example, then the time out value of T is extended in unison with a work in which the user frequently watches a picture on the display screen while not moving the operation media so much, user's peculiar way of operating the information processing apparatus such as the slow movement of the pen and the user's skill. With this arrangement, it is possible to prevent the information processing apparatus from being placed in the standby mode unintentionally.

According to the arrangement shown in the functional block diagram of FIG. 1 and the processing shown in the flowcharts of FIGS. 3 and 4, the information processing apparatus of the present invention becomes energized immediately after the operation medium such as the pen and the finger approaches or comes in contact with the information processing apparatus and the user can continue to operate the information processing apparatus smoothly while the user's work and thinking are not interrupted even when the operation medium is temporarily away from the information processing apparatus. Further, if the operation medium is not operated for a long period of time, then the controlled object can automatically be set in the power saving standby mode, thereby saving an electric power. In addition, the distance detection sensitivity d used when the approach of the operation medium is detected can be varied depending on the kinds of sensors as will be described later on.

Figure 5:
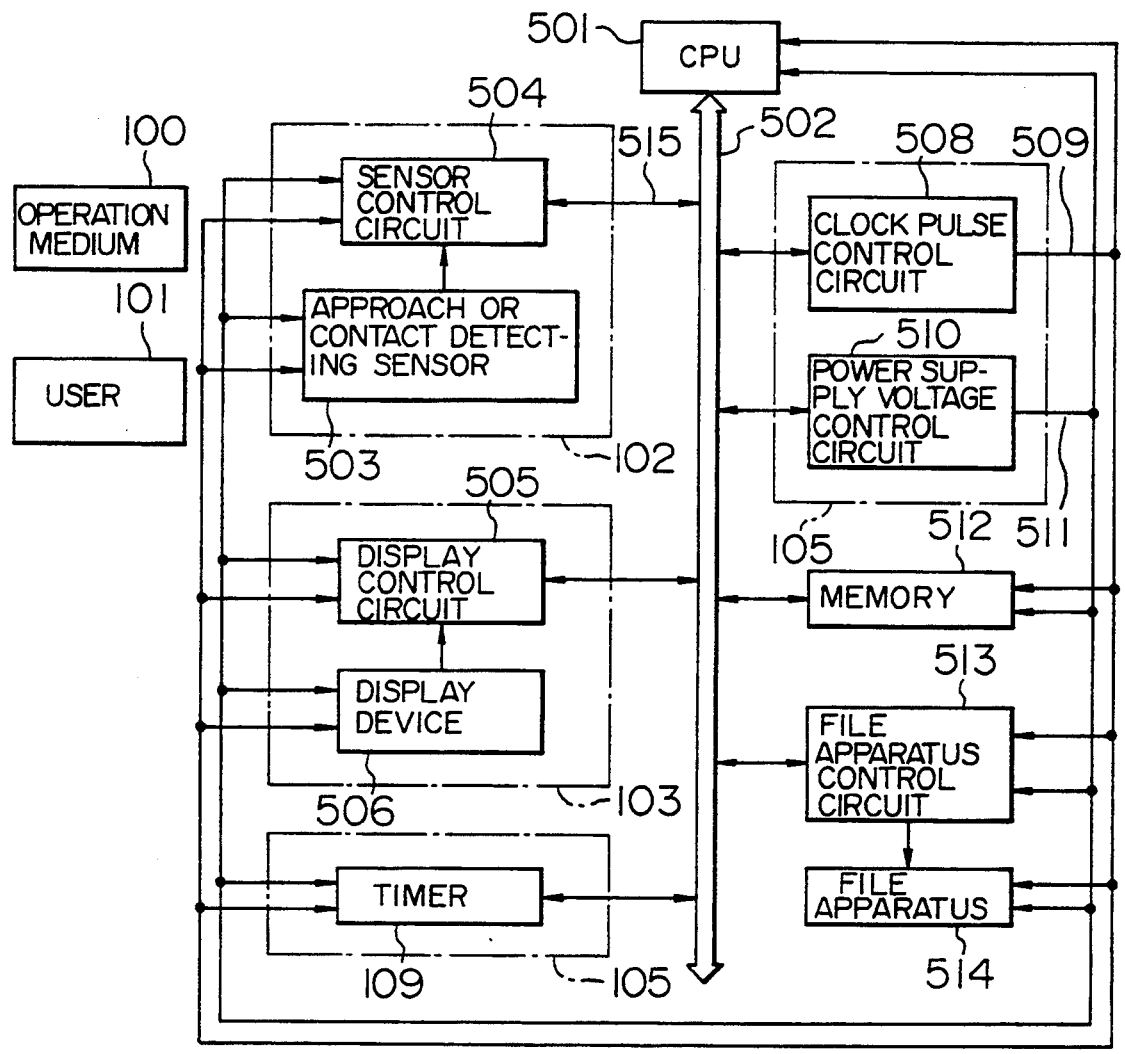
FIG. 5 is a block diagram showing a hardware according to an embodiment of the present invention.

FIG. 5 is a block diagram showing an arrangement of the hardware of the information processing apparatus according to the present invention. As shown in FIG. 5, there is provided a central processing unit (hereinafter simply referred to as a CPU) 501 which executes a program stored in a memory 512 via a bus 502 to thereby control the whole operation of this information processing apparatus, such as the control of a variety of input/output control circuits, the memory 512, data processing, data transfer and calculation. A sensor 503 detects the approach or contact situation of the operation media 100, 101. The CPU 501 is responsive to a signal 515 from a sensor control circuit 504 to execute the program processing and the electric power saving control of the controlled object 106 (see FIG. 1) under the control of the electric power saving control unit 105 (see FIG. 1). Also, the condition that the information processing apparatus is energized or set in the standby mode is displayed on the state display unit 103 (see FIG. 1). The signal 515 indicative of the approach or contact situation of the operation media 100, 101 might be any of an interrupt signal and a status signal for the CPU 501. The aforementioned timer 109 (see FIG. 1) counts a time passed after the operation media 100, 101 had been away from the sensor 503. A display device 506 is formed of some suitable display devices such as a liquid crystal display (LCD) device or the like and displays thereon characters, graphic image, image, picture, hand-written information or audio data under the control of a display control circuit 505. A clock pulse control circuit 508 is adapted to control a period of a clock pulse of electronic circuits in response to a signal 509 supplied thereto. A power supply voltage control circuit 510 is adapted to control the power supply voltage of the electronic circuits in response to a signal 511 supplied thereto. As shown in FIG. 5, as the controlled object, there can be enumerated a whole of or a part of electronic circuits, such as the CPU 501, the memory 512, the clock pulse control circuit 508, the power supply voltage control circuit 510, the timer 109, the sensor 503, the display device 506, a file apparatus 514, the sensor control circuit 504, the display control circuit 505, and a file apparatus control circuit 513. The file apparatus control circuit 513 is adapted to control the file apparatus 514 such as a floppy disk apparatus, a hard disk apparatus and an optical file apparatus. The file apparatus 514 and the file apparatus control circuit 513 are not indispensable for the arrangement of the information processing apparatus according to the present invention. Although a keyboard, a mouse, etc., is connected to the information processing apparatus as other apparatus, these elements are not directly related to the present invention and therefore need not be described herein.

As the controlled object 106 that is controlled so as to save an electric power according to this embodiment, there are roughly classified two kinds of controlled objects, i.e., power supply voltage and clock pulse.

As a method of controlling the power supply voltage, there are enumerated the following examples:

(1) A power supply voltage of a whole of or a part of an electronic circuit incorporated within the information processing apparatus is switched from a high voltage to a low voltage (e,g., a combination of high voltage and low voltage is 5 V, 3 V or 3 V, 2 V, etc.);

(2) When the display device 506 is of a liquid crystal display device, for example, there are available two kinds of liquid crystal display device with a so-called back light and a liquid crystal display device without the back light. When the display device 506 is formed of the liquid crystal display device with the back light, a brightness of the back light (not shown) is reduced or the back light is turned off by lowering or interrupting the power supply voltage of the back light;

(3) When the information processing apparatus is connected with the file apparatus 514 such as the floppy disk apparatus, the hard disk apparatus and the optical disk apparatus, the supply of the voltage to a drive motor (not shown) of the file apparatus 514 is stopped;

(4) A function similar to a so-called resume function is effectively utilized. That is to say, a part of the memory 512 is formed as a nonvolatile memory (not shown) such as a flash memory or the like and contents stored in a register and a work memory immediately before the electric power saving control is started are saved in the nonvolatile memory. Then, all powers other than those of the CPU 501, the sensor 603, the sensor control circuit 504 and the display control circuit 505 are turned off. When the information processing apparatus becomes active, then the above-mentioned powers are turned on and the contents saved in the nonvolatile memory are recovered; and (5) When the display device 506 is formed of the liquid crystal display device with the back light, a brightness of the back light is reduced or the back light is turned off by varying a frequency or duty ratio of a clock pulse input to a control circuit (e.g., inverter, etc.,) of the back light.

As a method of controlling the clock pulse, there are enumerated the following examples:

(6) Frequencies of clock pulses of all electronic circuits other than the sensor 503 and the sensor control circuit 504 are lowered from predetermined values of the non-power saving state in which the information processing apparatus is operated to the full or the supply of such clock pulses is stopped; and (7) A display on the liquid crystal display device, for example, is eliminated by stopping the supply of a clock pulse of a video memory (not shown) incorporated within the display control circuit 505.

Although the CPU 501 also may be de-energized in the case of (7), if the signal 515 from the sensor control circuit 504 is supplied to the CPU 501 as the interrupt signal, then the CPU 501 can be returned to the non-power saving state.

In FIG. 5, when each of display elements forming the display device 506 is a flat display panel in which pixels are arrayed in a two-dimensional fashion, in addition to the liquid crystal display panel, it is possible to utilize some proper display devices, such as an LED panel, an EL (electroluminescence) panel, a plasma display panel and a CRT (cathode ray tube). As a method of displaying the condition that the information processing apparatus is in the standby mode or is in the active state, there can be enumerated the following methods:

(A) Some proper display devices such as a liquid crystal, a lamp, an LED, an LED and a plasma display device are individually provided in the display device 506 in response to the above-mentioned two states of the information processing apparatus;

(B) There is provided any one of the aforesaid display devices and a brightness thereof, a color thereof or a blinking period thereof is varied;

(C) Different sounds corresponding to the above-mentioned respective states are emanated from some suitable sound generating means such as a buzzer or the like; and (D) An audio message is output from a loudspeaker.

Embodiments that utilize several kinds of operation media and corresponding sensors will be described hereinafter. Prior to describing the embodiments, concerning the typical kinds of tablets which are one of the sensors, specifications such as a transparent tablet, an opaque tablet, an approach detection type tablet, a contact detection type tablet and the kinds of operation media that can be detected are illustrated on the following table 1.

formed with each other will hereinafter be referred to as "pen/finger input medium" for simplicity.

Figure 6:
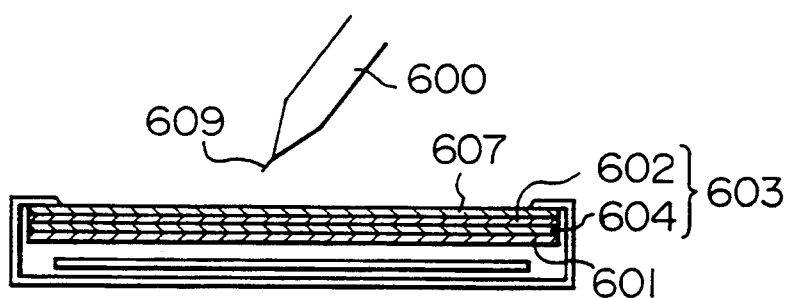
FIG. 6 is a schematic cross-sectional view illustrating a pen/finger input device in which a display portion is laminated on the outside of the pen/finger input device and a tablet is laminated on the inside thereof according to the present invention.

FIG. 6 shows the embodiment which utilizes the pen/finger input medium in which a display portion is laminated on the surface side of the housing portion and a tablet is laminated on the inside portion of the housing portion. As shown in FIG. 6, a display portion 603 is formed of a liquid crystal display panel 602 with a back light 604, for example. A tablet 601 is an electromagnetic induction system tablet. If a stylus pen 600 for the electromagnetic induction system tablet 601 on the table 1 is used as an operation medium, then as is conventional, the approach of the stylus pen 600 can be detected even when a distance between the pen 600 and the tablet 601 is about 10 mm. Therefore, even when the liquid crystal display panel 603 with the back light 604 having a thickness of about 5 to 7 mm and a surface

TABLE 1

CHARACTERISTICS OF TYPICAL TABLETS

| Kinds of tablets | trans-parency | detection characteristic | | | operation medium | | | re-marks |
|---|---|---|---|---|---|---|---|---|
| | | approach | contact | press | part of body | pen-shaped member | exclusive pen | |
| Electro-magnetic induction system | opaque | ○ | ○ | ○ | X | X | necessary | pen-point switch to detect contact |
| Capacitance system | trans-parent | X | ○ | X | ○ | X | possible | pen is conductive |
| Electrostatic coupling system | trans-parent | ○ | ○ | X | ○ | X | possible | pen is conductive |
| Pressure-sensitive resistance system | trans-parent | X | ○ | X | ○ | ○ | not necessary | |
| Transmission pen type ultra-sonic system | trans-parent | X | ○ | ○ | X | X | necessary | ultra-sonic transmission from pen |
| Surface acoustic wave type ultra-sonic system | trans-parent | X | ○ | ○ | ○ | X | possible | pen is ultra-sonic absorption property (e.g., rubber) |
| Optical system | trans-parent | ○ | ○ | X | ○ | ○ | not necessary | |

Embodiments that utilize the characteristics of the above-mentioned tablets on the table 1 will be described below.

Figure 7:
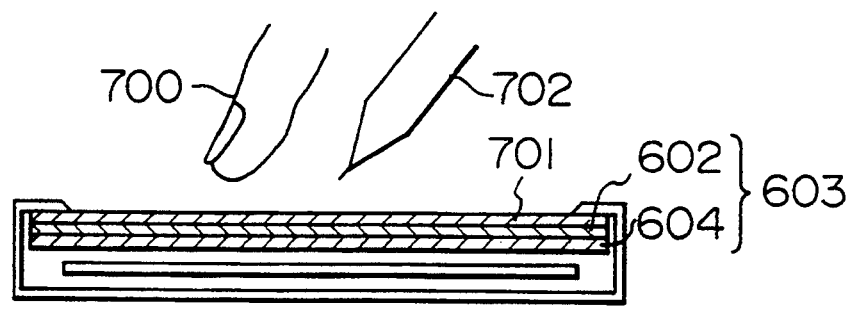
FIG. 7 is a schematic cross-sectional view illustrating the pen/finger input device in which the display portion is laminated on the inside of the pen/finger input device and the tablet is laminated on the outside thereof.

FIGS. 6 and 7 show in a cross-sectional structure fashion the embodiments in which an approach detection type or a contact detection type tablet such as an operation medium or the like and the flat display panel are integrally formed with a housing portion of the information processing apparatus of the present invention. As a method of integrally forming the tablet and the flat display panel, there can be enumerated the following methods:

(a) Tablet elements and display elements are alternately arrayed and mounted on the same surface of one display panel in a two-dimensional fashion;

(b) A tablet is formed on one surface of the same display panel and a display device is formed on the other surface of the same display panel; and (c) A tablet panel and a display panel are laminated in the upper and lower direction.

FIGS. 6 and 7 show the method (c). The arrangement in which the tablet and the display panel are integrally protecting glass 607 having a thickness of several millimeters are interposed between the stylus pen 600 and the tablet 601, the approach of the stylus pen 600 can be detected through the liquid crystal display panel 603 and the surface protecting glass 607. Accordingly, the electric power saving control and the display control described in the embodiment shown in FIGS. 1 through 5 are effected in response to the approach situation of the stylus pen 600. Particularly, in the display control method, if handwriting information input with the pen is displayed in an inking display fashion or in a cursor display fashion at the same position as the position at which information is hand-written at the same time when the above information is input, then the user can confirm with ease that the information processing apparatus is energized. In addition, only moving the stylus pen 600 near the tablet 601 without special operation, the user can operate the stylus pen 600 spontaneously such as when the user inputs information by hand-writing or the like.

The electromagnetic induction system tablet 601 can also effect the contact detection (see table 1). As shown in FIG. 6, the stylus pen 600 has on its top formed a pen point switch 609. When the ON- or OFF-state of the switch 609 is detected after the approach of the stylus pen 600 was confirmed by the tablet 601, it can be determined on the basis of the detected result whether or not the stylus pen 600 is brought in contact with the surface protecting glass 607. Therefore, even when the pen point switch 609 is brought in contact with portions other than the surface protecting glass 607 inadvertently, the pen point switch 609 is not located close to the tablet 601 and hence such unintentional contact of the switch 609 can be neglected. As described above, by effectively utilizing the electromagnetic induction system tablet, it is possible to realize the pen/finger input medium of the display panel-built in type structure which can effect both the approach detection and the contact detection.

FIG. 7 shows a built-in structure of another example of the pen/finger input medium in which a tablet is laminated on the surface of a housing portion and a display portion is laminated on the inside thereof. As shown in FIG. 7, an approach or contact detection type tablet 701 serves both as the tablet and the surface protecting glass. The tablet 701 is made of a transparent material so that the user can visually confirm the display portion from the outside. As the transparent tablet 701, there can be used any one of a capacitance system tablet, an electrostatic coupling system tablet, a pressure sensitive resistance system tablet, a transmission pen type ultrasonic system tablet and a surface acoustic wave type ultrasonic system tablet (see table 1). Because the electrostatic coupling system tablet is formed of electrodes disposed on the tablet surface in a stripe-shaped fashion and a conductive member such as a pen or the like to detect the change of capacitance, the capacitive coupling system tablet can also detect the approach of the pen/finger input medium. Further, the optical system tablet can detect both the contact and approach of the pen/finger input medium depending on the distance in the height direction from a touch-sensitive surface of an array of sensing and emitting devices disposed around a bezel (frame portion encircling the tablet). More specifically, if the array of sensing and emitting devices is set at the position distant from the touch-sensitive surface, then the optical system tablet can detect the approach of the pen/finger input medium. If on the other hand the array of sensing and emitting devices is located to the extent that the array of sensing and emitting devices is almost brought in contact with the touch-sensitive surface, then the optical system tablet can detect the contact of the pen/finger input medium (see table 1).

In FIG. 7, the electric power saving control method based on the approach or contact detection, the display control method and the kinds of the flat display panels are treated in the same way as those of the example shown in FIG. 6 and therefore need not be described herein.

If a display panel having a thickness of less than several millimeters and which has no a back light provided therein is used as the liquid crystal display panel 603 shown in FIGS. 6 and 7 instead of the liquid crystal display panel with the back light, then it becomes possible to detect a distant operation medium as compared with the case that an operation medium is detected via the display panel with the back light. Therefore, when the operation medium is approaching, the controlled object can be switched to the non-power saving state, i.e., set in the active state earlier than the case that the display panel with the back light is used. Furthermore, if a semi-transparent type display panel is used as the liquid crystal display panel 603 and the electric power saving control is effected such that the back light is in its OFF-state while the liquid crystal display panel is still being energized, then when the operation medium approaches the information processing apparatus, the displayed content on the display panel can be visually confirmed by the user. Hence, the electric power saving effect can be achieved and also the user can continue his own interrupted work and thinking smoothly.

As examples of the application of the pen/finger input device shown in FIGS. 6 and 7, there can be enumerated a pen-base personal computer, a pen-input type word processor, a handwriting input apparatus, a handy terminal apparatus, a portable computer, an ATM (automated teller machine), an information guide apparatus, a POS (point of sales) system terminal apparatus and so on that can be operated with a pen or finger. Of the floor-type information processing apparatus and the desktop type information processing apparatus, if the tablet is provided not only in the display portion but also in other housing portion of the apparatus, then it becomes easier for the user or operation medium to approach the apparatus from a variety of directions. The tablet, however, need not be provided in the place that the user or operation medium cannot approach usually, such as a bottom of the apparatus or a portion near the leg portion of the apparatus. The above-mentioned approach or contact detection sensor might be provided in the place that the user or operation medium can approach the apparatus with ease. In the case of the small-sized handy equipment such as an electronic calculator, a portable computer, an electronic memo, a handy terminal apparatus or the like, it is frequently observed that the users are annoyed by an unintentional actuation of such equipment because such small-sized handy equipment is designed to be sensitive so that they can be energized readily even with the slight touch of hand, etc. In that case, it is preferable to use a tablet that can be energized with a proper pressure of hand, etc. The pressure detection function indicated on the foregoing table 1 can be realized with a proper pressure by using the electromagnetic induction system tablet and the ultrasonic system tablet. Alternatively, in the pressure-sensitive resistance system tablet, some suitable members that might be called dot spacers are disposed at a constant interval in a two-dimensional fashion in order to maintain a very small spacing between transparent conductive films or between a transparent conductive film and a glass substrate with a transparent electrode. If a pressure-sensitive resistance system tablet having a very small spacing is utilized, then the tablet is made insensitive to the extent that the tablet cannot respond to a slight touch of hand and finger.

Figure 8:
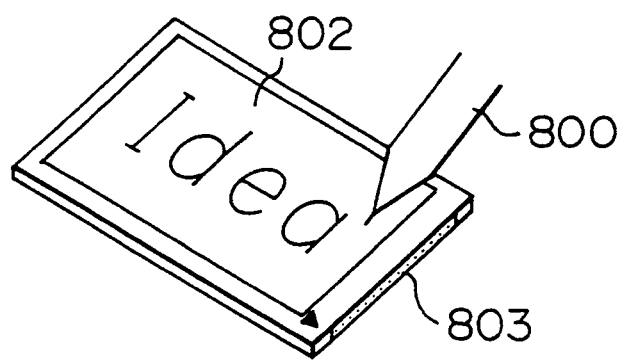
FIG. 8 is a conceptual diagram of an international standard specification IC card having a pen/finger input device function according to the present invention.
Figure 9:
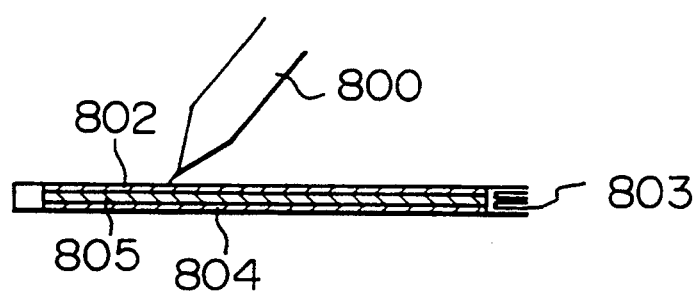
FIG. 9 is a schematic cross-sectional view of the international standard specification IC card having the pen/finger input device function according to the present invention.

The pen/finger input device that had been described so far with reference to FIGS. 6 and 7 can be applied to IC (integrated circuit) cards. FIGS. 8 and 9 are respectively a conceptual diagram and a cross-sectional view of a CPU-incorporated type IC card having the pen/finger input device provided on its surface. As illustrated, by providing the pen/finger input device at least on one card surface, it is possible to realize an electronic memo in which the user can readily input data by the handwriting, as will be described later on.

FIG. 9 shows an example of the electronic memo in which display-built-in type pen/finger input devices 802, 804 are provided on both the front and rear surfaces of the IC card. If a polymer dispersion type liquid crystal having a thickness of, for example, several 100s of microns is used as the display device of the pen/finger input devices 802, 804, then a polarizing plate need not be provided and an ultra-thin type display panel with a high contrast can be realized without using the back light. The tablet might be formed of any one of the earlier noted electromagnetic induction system tablet, capacitance system tablet, electrostatic coupling system tablet, pressure-sensitive resistance system tablet, transmission pen type ultrasonic system tablet or surface acoustic wave type ultrasonic system tablet. An operation medium 800 might be formed of a pen, a finger or the like in accordance with the types of the above-mentioned tablets. In FIGS. 8 and 9, reference numeral 803 denotes a 68-pin 2-column two-piece type connection terminal conforming to the specification of the JEIDA (Japan Electronic Industry Development Association) Version 4.1 that is the standard for IC cards, for example. It is to be desired that an interface specification, an attribute specification, an electrical specification and an physical specification are based on the standard specification as much as possible.

Although the CPU-incorporated type cards are slow in developing the standardization as compared with memory cards at present, the ISO (International Organization for Standardization) is now proceeding the international standardization work, and physical specifications, such as shape of card, dimension of terminal, position of terminal, etc., are almost determined accordingly. In FIG. 9, reference numeral 805 denotes a package portion in which a CPU or an electronic circuit such as a flash memory, which will be described later on, is incorporated. A thickness of the package portion 805 is adjusted such that the whole thickness of the IC card including the pen/finger input devices 802, 804 is based on the above-mentioned standard specification.

By using the IC card type electronic memo of the present invention, it is very convenient for the user to write down an idea occurred or obtained information during his movement or his telephone call impromptu. If the user always carries the electronic memo of the present invention in the pocket under the condition that the electronic memo is in the power-saving state, the electronic memo is set in the non-power saving state when the user writes down input data with the pen or finger and then the tracing of such handwriting is displayed in an inking fashion, then the user can visually confirm at once that the electronic memo is energized and the user can input data naturally as if the user were writing down the idea on a memo without interrupting a series of operation. In particular, because the display-built-in type pen/finger input devices 802, 804 are provided on both the front and rear surfaces of the IC card as shown in FIG. 9, the user can take a note of an idea or information impromptu as if the user took a note of an idea or information on blank sheets of paper. Further, as is well-known, if the pressure-sensitive resistance system tablet, the capacitance system tablet, the electrostatic coupling system tablet and the surface acoustic wave type ultrasonic system tablet that can detect the touch of the finger are utilized, then the user can input information into this electronic memo only with the finger even when the user has nothing to write with such as a pen or the like at hand. The information input by the handwriting is stored in a nonvolatile memory such as the flash memory or the like incorporated within the electronic memo. Thereafter, if memo information stored in the flash memory is read out by the personal computer at the office or at home and the idea or information is classified, then it is very convenient for the user to effectively utilize such useful information. Further, the front surface and rear surface of the IC card can be properly used, such as when the front surface of the IC card is used as a memo for writing down telephone numbers or the like and when the rear surface thereof is used as a memo for writing down an idea.

If in the electronic equipments shown in FIGS. 6, 7 and 9 a handwritten memo stored in the flash memory is read out during the power saving period, characters and graphic patterns are automatically recognized and then the recognized results are stored in the flash memory together with the handwritten memo, then when the handwritten memo and recognized results are organized later by the personal computer or the like, the whole of or a part of characters or graphic patterns is coded so that such coded information can be more effectively utilized as compared with the handwritten information, such as when the coded information is effectively utilized as a data base of an address book or the like. As the recognized result, there may be stored a unique result code if the handwritten memo can be recognized reliably. If on the other hand the handwritten memo is illegible and cannot be recognized automatically, with respect to handwritten characters whose similarity to a recognition standard pattern is comparatively high, a plurality of nominated handwritten characters may be coded and then stored as the recognized results. In this case, if there are characters and graphic patterns that cannot be recognized automatically, then the handwritten memo will be utilized as auxiliary information that is required by the user to recognize and code the handwritten memo in a manual fashion. Further, it is frequently observed that the handwritten memo that the user wrote in a hurry cannot be read even by man or it is very cumbersome for the user to write down a memo while standing. In this case, if a sound memo function (not shown) formed of a microphone, an A/D (analog-to-digital) converter and a nonvolatile memory or the like is added to or is used together with the equipments shown in FIGS. 6, 7 and 9, the above-mentioned electronic memo can be effectively utilized as a more reliable handwritten auxiliary equipment or audio memo. Further, when a telephone number is input on a memo in the form of only numerals, if there are displayed a plurality of handwritten numeral input boxes of a predetermined digits and one numeral is written per box, then it is needless to say that a numeral recognition probability can be increased because there are less recognition standard patterns and numerals are input one by one.

Figure 20:
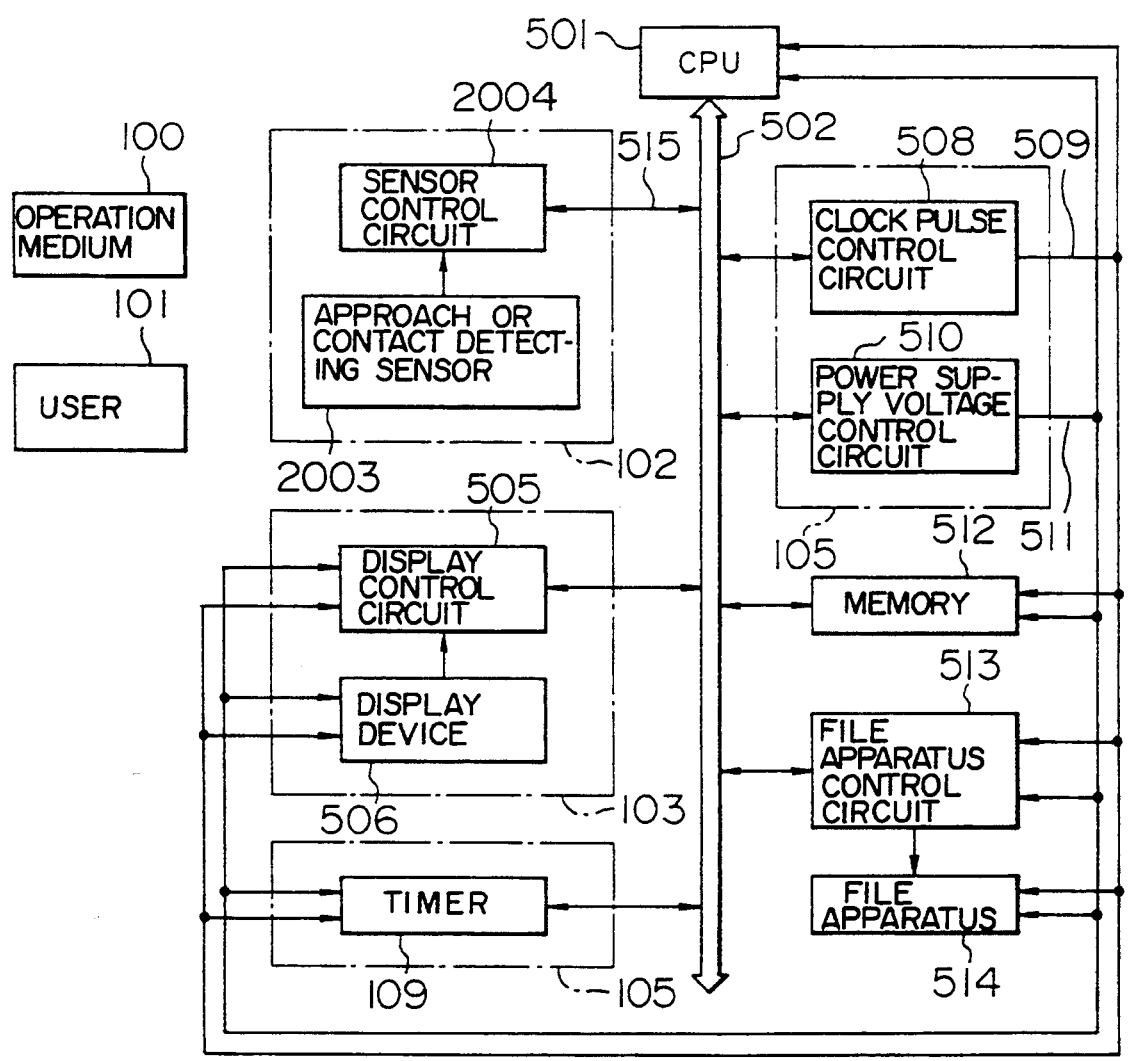
FIG. 20 is a block diagram showing a hardware of the information processing apparatus according to another embodiment of the present invention.

In the respective embodiments using the aforesaid tablets, the coordinate input that is the original function of the tablet and the approach or contact detection function are both used. Also, the electric power saving control operation such as the tablet control, the decrease of the clock frequency of the control circuit or a low voltage driving or the like is carried out such that the tablet is operated as only the approach or contact sensor. Further, such a variant is also possible that the approach or contact situation of the operation medium can constantly be monitored by using approach/contact detection exclusively-designed sensor such as an image sensor, a microphone or a temperature sensor instead of the tablet regardless of the situation that the whole of the apparatus is set in the power saving state/non-power saving state. FIG. 20 shows a block diagram of the hardware for the above-mentioned case. In FIG. 20, reference numeral 2003 designates an approach or contact detection sensor, and 2004 a sensor control circuit. In this case, an electric power saving control such as a clock pulse frequency control and the power supply voltage control is not carried out as shown in FIG. 20.

Embodiments that utilize sensors other than the tablet will be described below.

FIG. 10 is a conceptual diagram of an apparatus that utilizes image information supplied thereto from some proper image apparatus such as a television camera to judge whether or not the user operation medium approaches. According to this embodiment, as shown in FIG. 10, by effectively utilizing the fact that image information such as the user operation medium obtained from a television camera 1001 is changed considerably, it is determined whether the user operation medium 1000 is approaching or is separated from the apparatus. In FIG. 10, reference numeral 1002 designates a display unit. If a fisheye lens or a wide-angle lens is used as a lens of the television camera 1001, then a wide field of vision around the apparatus can be detected with the result that the approach of the operation medium 1000 can be picked up as a picture more reliably. In addition, in the case of the wide-angle lens, a depth of focus is small and therefore the change of a shading of a picture of a distant scene becomes small and such small change can be neglected.

FIG. 11B shows a time relationship between a black pixel count value B(t) in a binary image (signal) from the television camera 1001 and the state of the apparatus, i.e., a distance in which the operation medium 1000 is approaching from the condition that no operation medium is staying around the apparatus and comes away from the apparatus after the apparatus was operated in FIG. 10 and the change that the black pixel count value B(t) in the binary image is changed with time. As shown in FIG. 11, when no operation medium is staying around the apparatus, only a distant scene is changed. However, because such distant scene is not focused, the value of the black pixel count value B(t) is not changed substantially. In this case, the apparatus is set in the standby mode under the power saving state. When the operation medium 1000 is approaching the apparatus, the operation medium 1000 is started being focused and an image thereof becomes large so that image information is changed considerably and the value of the black pixel count value B(t) is increased. If the operation medium 1000 approaches a certain distance of the apparatus, then the value of the black pixel count value B(t) becomes larger than a threshold value $\theta$ so that the apparatus enters the non-power saving state. Then, it is displayed that the apparatus is made active. During the user operates the apparatus by using the operation medium 1000, the value of the black pixel count value B(t) is changed in response to a motion of hands and fingers. Although it is frequently observed that the value of the black pixel count value B(t) becomes smaller than the threshold value $\theta$, a time in which the value of the black pixel count value B(t) is smaller than the threshold value $\theta$ is short and the apparatus continues its non-power saving state. Soon after the user gets away from the apparatus, the value of the black pixel count value B(t) becomes small and then settled in the state that it becomes smaller than the threshold value $\theta$. If a duration of this state becomes longer than a predetermined time T, then the information processing apparatus again enters the standby mode under the power saving state.

Figure 12:
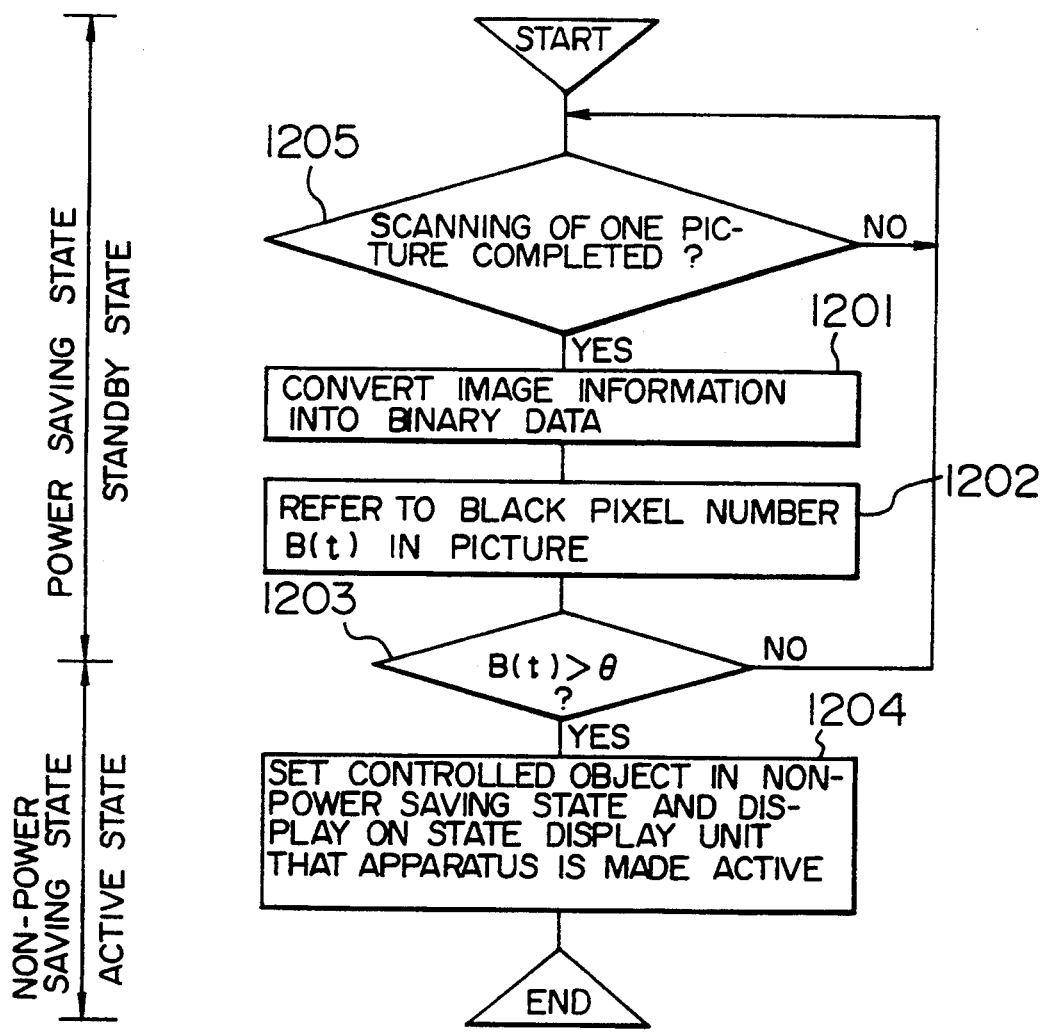
FIG. 12 is a flowchart according to the present invention, and to which references will be made in explaining the processing executed when the controlled object is switched from the power saving state to the non-power saving state.
Figure 13:
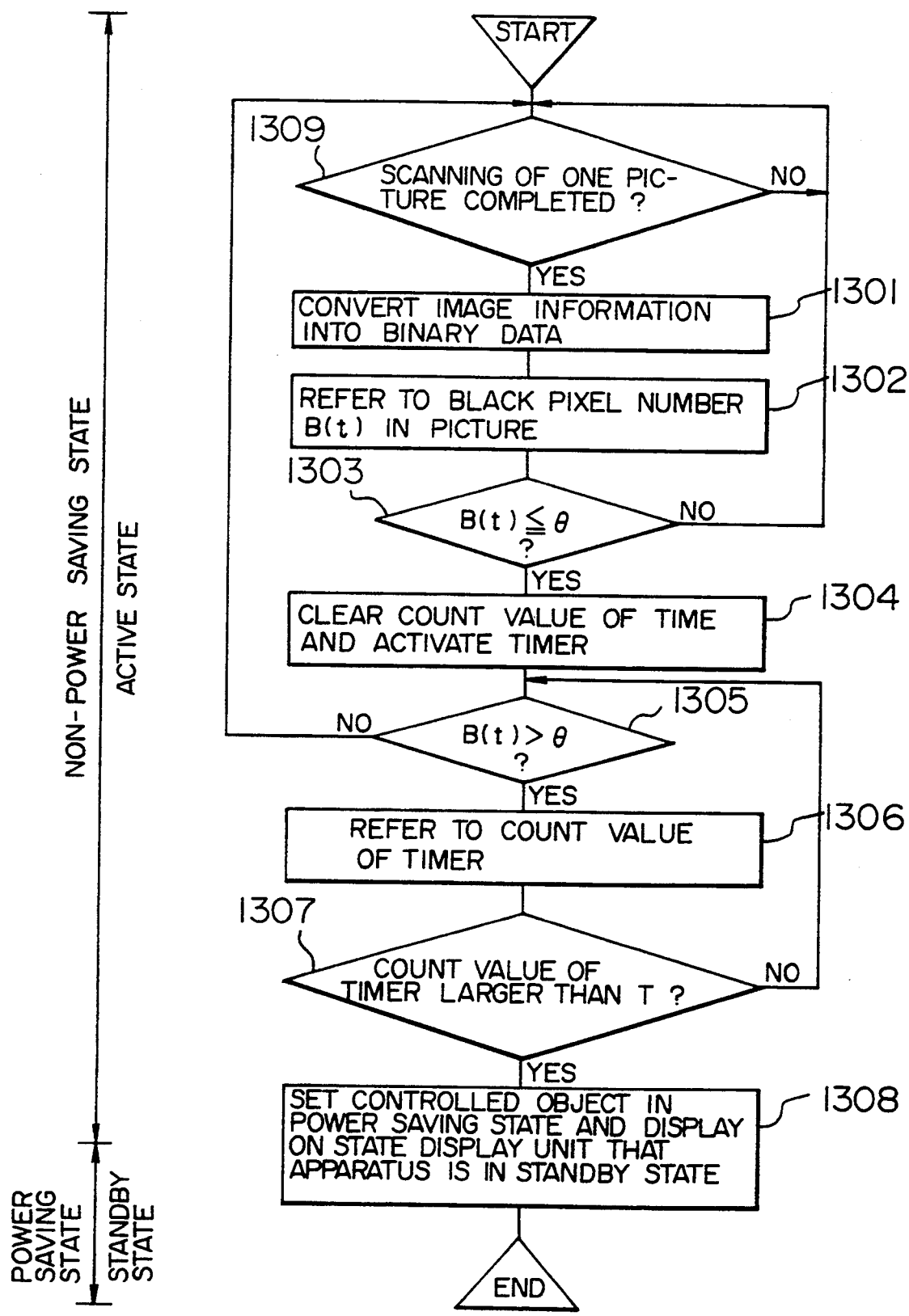
FIG. 13 is a flowchart according to the present invention, and to which references will be made in explaining the processing executed when the controlled object is switched from the non-power saving state to the power saving state.

FIGS. 12 and 13 show examples of flowcharts of the electric power saving control operation and the state display control operation that are executed by using video information from the television camera 1001, respectively. Because the situation that the electric power saving control and the state display control of the value of the black pixel count value B(t) shown in FIG. 11 are changed with time becomes similar to the change of the distance shown in FIG. 2, such situation need not be described herein and only a part inherent in the image information will be described. In any of the flowcharts shown in FIGS. 12 and 13, the processing is executed at the unit of fields corresponding to one picture of image information. A flowchart shown in FIG. 12 corresponds to the flowchart shown in FIG. 3 and is used to judge whether or not the operation medium 1000 approaches the apparatus while the apparatus is in the standby mode under the power saving state. A flowchart of FIG. 13 corresponds to the flowchart of FIG. 4 and is used to judge whether or not the operation medium 1000 is distant from the apparatus for a sufficiently long period of time while the apparatus is made active under the non-power saving state.

Referring to FIGS. 12 and 13, following the start of operation, it is judged in judgement steps 1205 and 1309 whether or not the scanning of one picture screen is completed by the image sensor. Further, in steps 1205 and 1309, the synchronization also is effected. In the next steps 1201 and 1301, image information of analog value is converted into binary value. Then, the processing proceeds to steps 1202 and 1302, whereat the black pixel count value B(t) within the picture screen is referred to. In the next judgement steps 1203, 1303 and 1305, it is judged whether or not the black pixel count value B(t) and the threshold value $\theta$ are compared with each other. The judgement steps 1202, 1303 and 1305 in which the black pixel count value B(t) and the threshold value $\theta$ are compared with each other correspond to the distance judgement steps 301, 401 and 403 in FIGS. 3 and 4.

Figure 14:
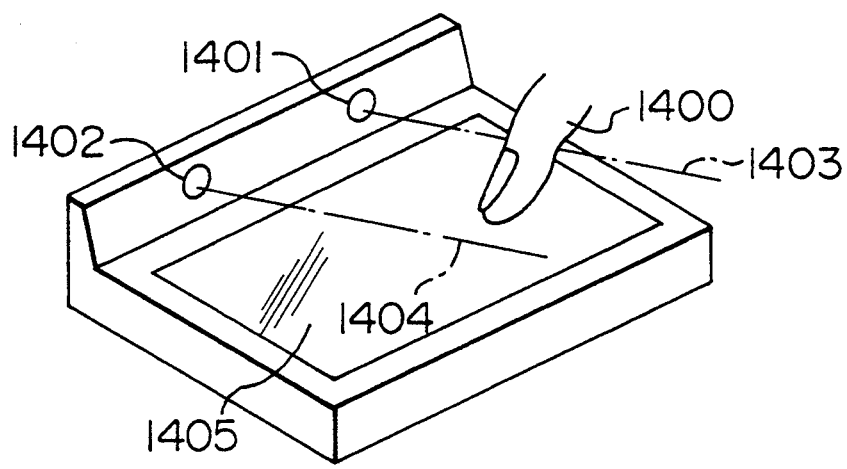
FIG. 14 is a conceptual diagram of an apparatus that detects the approach of the operation medium by utilizing a stereoscopy according to the present invention.
Figure 15:
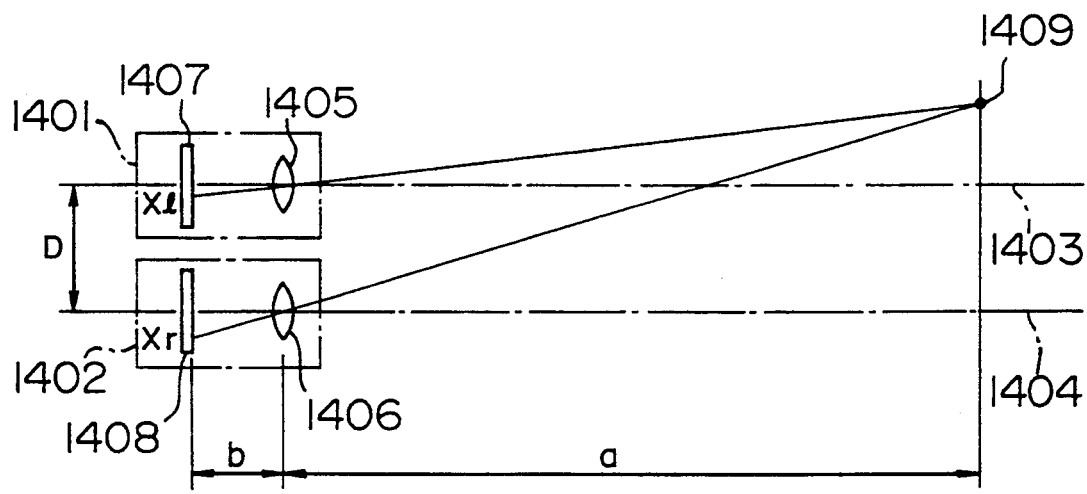
FIG. 15 is a diagram used to explain a principle of how to calculate a distance of a stereoscopy according to the present invention.

As a method of directly judging a distance between the apparatus and the object by using image information, there is known a method that utilizes a stereoscopy. As shown in FIG. 14, for example, two television cameras 1401 and 1402, each of which is formed of a lens and an image sensor though not shown, are located at positions distant from each other and a distance up to the object is calculated on the basis of a difference (parallax) of the images thereof. In FIG. 14, reference numeral 1405 designates a display portion. If the distance up to the operation medium or the like is sequentially calculated, then it can be determined by the processing similar to those of FIGS. 12, 13 for the black pixel count value B(t) in FIG. 12 that the operation medium approaches or gets away from the apparatus. As shown in FIG. 15, assuming now that optical axes 1403, 1404 of two television cameras 1401, 1402 are made parallel, b is a distance from the lenses of the television cameras 1401, 1402 to the image sensors thereof, D is a spacing between the two television cameras 1401, 1402 and $X_l$, $X_r$ are positions of object images, then a distance a from the lenses to the objects is expressed by the following equation (1):

$$a = bD/|X_l - X_r| \quad (1)$$

Accordingly, if corresponding point coordinates $X_l$ and $X_r$ of two images are obtained, then the distance to the object can be expressed by the equation (1). However, if $X_l = X_r$, then the object is infinite and therefore excluded from the object whose distance is calculated.

Figure 16A:
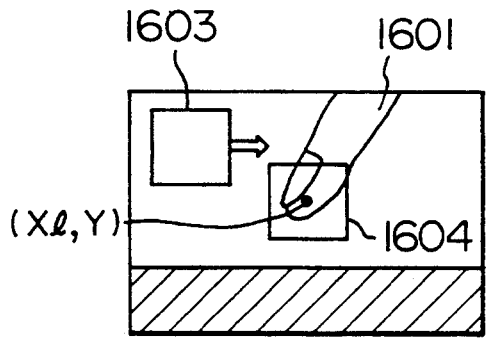
FIGS. 16A and 16B are diagrams used to explain a principle of how to detect a corresponding point of two images according to the present invention, respectively.
Figure 16B:
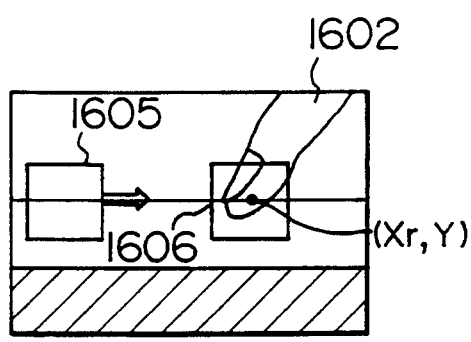

A principle of and an example of a circuit arrangement for obtaining a corresponding point in two images will be described below. FIGS 16A and 16B are schematic diagrams used to explain the principle of calculating the corresponding point in the two images and FIG. 17 is a block diagram showing the circuit arrangement for calculating the above-mentioned distance.

Figure 17:
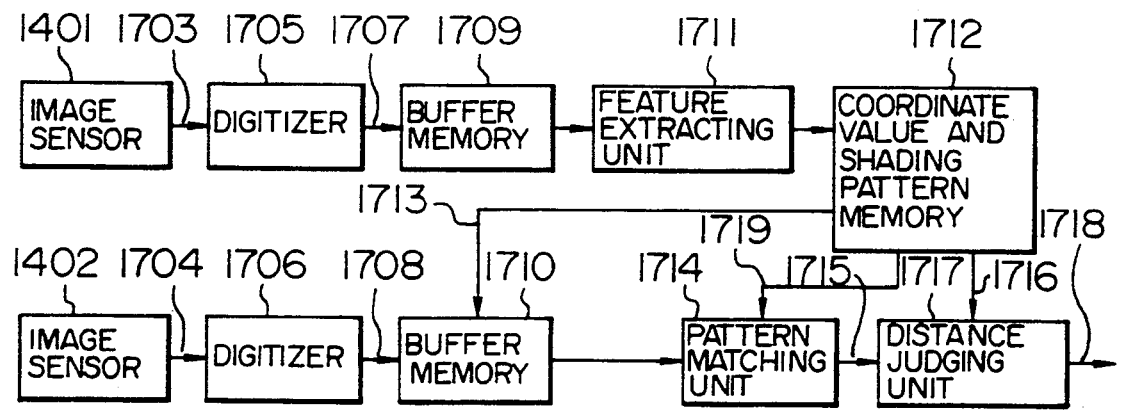
FIG. 17 is a block diagram showing a circuit arrangement of an information processing apparatus that detects a corresponding point of two images according to the present invention.

As shown in FIG. 17, analog signals 1703, 1704 from two image sensors 1401, 1402 are digitized by a sampling and A/D conversion in digitizers 1705, 1706, respectively. Digital signals 1707, 1708 are stored in buffer memories 1709, 1710, each of which is of a frame memory configuration that can store digital image information of one picture screen, for example. FIGS. 16A, 16B respectively show shading images stored in the frame memories, in which reference numerals 1601, 1602 depict images of the operation medium 1400. Reference numeral 1711 in FIG. 17 denotes a feature extracting unit which scans a local mask 1603 of a proper size on each point of an image shown in FIG. 16A to extract a coordinate ($X_l$, Y) of the feature at which the shading pattern within the mask is changed most. The coordinate ($X_l$, Y) is registered in a coordinate value registration unit/shading pattern memory 1712 together with the shading pattern 1604. The size of the scanning mask 1603 may be determined in advance in response to the size of the image such as the operation medium in the distance to be detected. In the image stored in the buffer memory 1710 and which is shown in FIG. 16A, the feature point extracting circuit 1711 scans the detected feature point coordinate ($X_l$, Y) and respective points on the same Y coordinate with a local mask 1605 of the same size as the local mask 1603. Then, shading patterns obtained from respective points and the registered pattern 1604 are compared with each other by a pattern matching unit 1714, thereby detecting the most similar shading pattern 1601 and its coordinate ($X_r$, Y). In FIG. 17, the Y coordinate common to the two images shown in FIGS. 16A, 16B is supplied from the coordinate value registration unit 1712 to the buffer memory 1710 in response to a signal 1719, and the shading pattern 1604 (see FIG. 16A) is supplied to the pattern matching unit 1714. In this way, the corresponding points ($X_l$, Y) and ($X_r$, Y) can be obtained. In FIG. 17, reference numeral 1717 denotes a distance judging unit which calculates a distance from $X_l$, $X_r$ obtained from signals 1713, 1716 and the equation (1) and, determines whether or not the calculated result is larger than the threshold value $\theta$ similarly to FIG. 12. A judged result is output from the distance judging unit 1717 as a signal 1718. In FIG. 17, because the two images shown in FIGS. 16A, 16B are processed by using the two-dimensional local masks 1603 and 1605, the buffer memories 1709, 1710 may be replaced with a two-dimensional local memory that can be realized by connecting a serial-input and serial-output shift register having a capacity of (n−1) rasters and serial-input and parallel-output registers having n×n pixels. As described above, the approach detection processing can be effected by a real time processing in synchronism with the scanning of the picture screen or by a so-called off-line processing during the blanking period.

Figure 18:
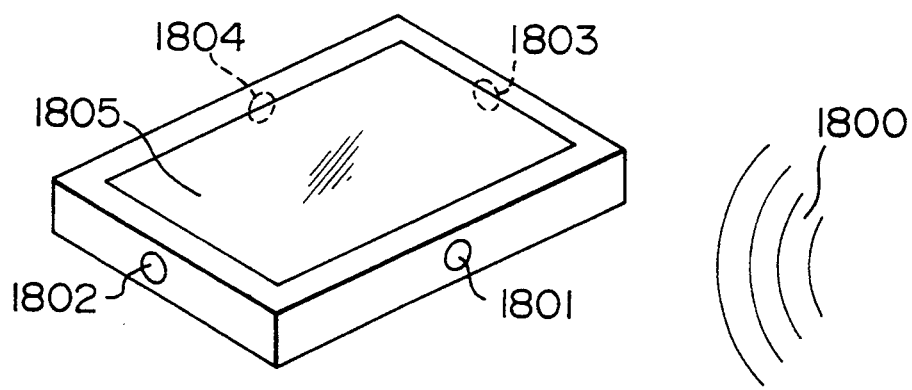
FIG. 18 is a conceptual diagram of an apparatus that detects the approach or contact of the operation medium by utilizing acoustic information according to the present invention.

FIG. 18 shows an example of an arrangement of an apparatus for detecting the approach or contact of the operation medium by utilizing acoustic information. As shown in FIG. 18, an operation medium 1800 provided as acoustic information such as a voice and a sound wave is detected by a microphone 1801. Although it is preferable that the microphone 1801 is of a non-directional microphone as much as possible so that the user can detect the operation medium 1800 by accessing the operation medium 1800 from any direction, microphones may be attached to side surfaces and rear surface of the housing as shown by reference numerals 1802, 1803, 1804 in FIG. 18. In FIG. 18, reference numeral 1805 designates a display portion.

When acoustic information is utilized to detect the approach or contact of the operation medium, there are proposed the following methods utilizing conventional technologies:

(i) Method of detecting an input sound wave having the same frequency spectrum as that of a previously-registered particular sound wave;

(ii) Method of judging a standard pattern of a previously-registered word speech or sentence and a feature pattern of the input speech in a pattern matching fashion by using a speech recognition technique; and (iii) Method of determining only a voice of a particular speaker by utilizing a speaker verification technique.

As the method (i), there are known various methods such as to generate a sound by hitting and rubbing an object around the apparatus or by playing a flute or the like. As the method (ii), there are roughly classified two kinds of voice recognition techniques depending on talkers, such as a talker dependent voice recognition system and a talker independent voice recognition system. In this embodiment, any one of the talker dependent voice recognition system and the talker independent voice recognition system may be utilized. Further, as the feature parameters used in the methods (ii) and (iii), there are known a great variety of feature parameters such as a filter bank, a linear predictive coefficient, k parameter, a power spectrum, a zero-cross number, a formant frequency, and an average pitch frequency. Any one of them may be utilized in this embodiment.

Figure 19:
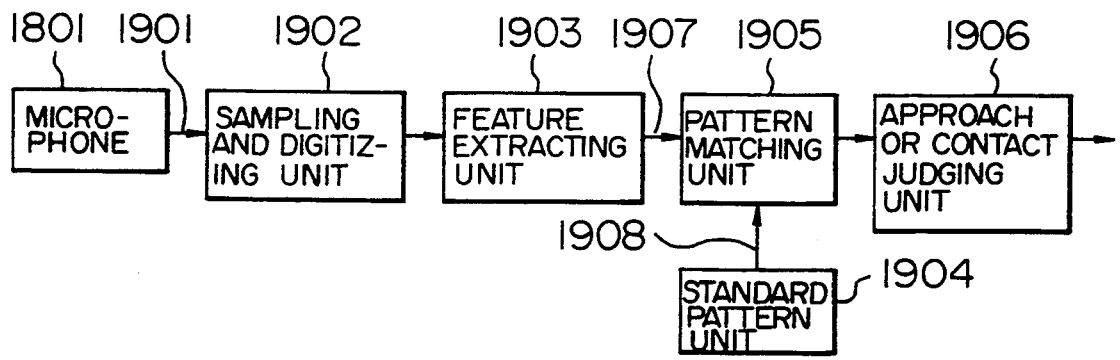
FIG. 19 is a block diagram showing a circuit arrangement of an information processing apparatus that detects the approach or contact of the operation medium by utilizing acoustic information according to the present invention.

FIG. 19 shows an example of the processing apparatus that detects an operation medium by utilizing acoustic information. As shown in FIG. 19, when an operation medium 1800 provided as acoustic information approaches or comes in contact with the apparatus, an analog acoustic signal 1901 is obtained from a microphone 1801. The acoustic information is sampled and digitized by a sampling and digitizing unit 1902. In this case, the acoustic information is sampled by effectively utilizing a ratio of power information to band power or a ratio of low band power to wide band power and so on. A feature extracting unit 1903 is adapted to any one of the above-mentioned frequency spectrum and the feature parameters or a combination thereof. There is provided a standard pattern unit 1904 in which a standard pattern 1908 of the contents corresponding to the above-mentioned (i), (ii) and (iii) is registered in advance. The feature parameter registered in the standard pattern unit 1904 is the feature parameter of the same kind as that of the input pattern 1907 extracted by the feature extracting unit 1903. A pattern matching unit 1905 is adapted to judge a similarity by verifying the input pattern 1907 and the standard pattern 1908. An approach or contact judging unit 1906 judges the approach or contact of the object on the basis of such similarity.

As other methods of detecting the approach or contact of the operation medium, there is known a method of detecting the approach or contact of the operation medium by detecting the change of a temperature. Because a bodily temperature is higher than that of the housing of the apparatus, when the user approaches or comes in contact with the apparatus with fingers or hands or blows on the apparatus, the change of a temperature is detected by temperature sensors distributed on the surface of the housing of the apparatus. As is conventional, if a thermocouple or thermistor is utilized a temperature sensor, a distributed structure of such temperature sensor can be realized. As a further method of detecting the approach or contact of the operation medium, there is known a method of detecting a presence or absence of the object in a short distance by utilizing an intensity of a reflected wave of an ultrasonic wave or infrared ray emitted from the apparatus or a method of calculating a distance to the object by detecting a phase delay of a reflected wave, etc.

Using the embodiments to which the tablets, the television camera, the stereoscopy, the microphone, the sensor such as the temperature sensor, and the liquid crystal, etc., are applied together with the further embodiment of the pen/finger input device in which the tablet is integrally formed with, for example, the television camera and the microphone as the display portion, the present invention can be applied to various equipments that are operated with a finger or pen. That is to say, the present invention can be applied to a great variety of equipments, such as the pen-based personal computer, the pen-input word processor, the handwriting input apparatus, a liquid crystal OHP (overhead projector), the electric calculator, the small computer, the electronic memo, an electronic book, an electronic register, the handy terminal apparatus, the consoles of process and plant, the kiosk such as the POS terminal apparatus, the ATM, the street information guide apparatus and a new media terminal apparatus, a mobile navigation apparatus, an oscilloscope, the automatic vending machine, OA (office automation) equipments such as a table having an input unit and a display unit or the like, computer related equipments, communication equipments, FA (factory automation) equipments, information guide equipments, measurement equipments, consumer equipments, domestic electrification equipments, mobile equipments, game equipments, etc.

As described above, according to the present invention, it is possible to realize the system in which the apparatus is set in the power saving mode when the apparatus is not in use and the apparatus can be used immediately after the pen or finger approaches or comes in contact with the apparatus. Accordingly, it can be expected that a remarkable power saving effect can be achieved on the whole of the apparatus, and the user can readily resume his work or thinking that was interrupted when the user left his seat. Therefore, it is possible to realize the apparatus system having excellent operability.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information processing apparatus comprising:
   a housing;
   a detecting means for detecting whether a user-associated medium at least approaches at least a part of a housing of said apparatus; and
   a control means for effecting control wherein, if said user-associated medium at least approaches said detecting means, a controlled object is set in a non-power saving state, and wherein, if said user associated medium is distant from said detecting means for at least a predetermined constant period of time, at least a part of said controlled object is set in a power saving state.

2. The information processing apparatus according to claim 1, further comprising a state display means including a display means and for displaying on said display means that said apparatus is in one of a standby state and an active state in response to said power saving state and said non-power saving state, respectively.

3. The information processing apparatus according to claim 2, wherein said display means is a flat display panel.

4. The information processing apparatus according to claim 3, wherein said flat display panel is a liquid crystal display panel.

5. The information processing apparatus according to claim 3, wherein said flat display panel has a laminated monolithic structure constituting a part of said housing.

6. The information processing apparatus according to claim 3, wherein a shape of the housing of said apparatus, an interface specification such as connectors, an attribute specification, an electrical specification, and a physical specification are based on a standard specification of an IC card.

7. The information processing apparatus according to claim 1, wherein said controlled object is a voltage power supply incorporated in said apparatus and said control means sets a power supply voltage to at least a portion of said apparatus to a high voltage when said controlled object is in said non-power saving state and to a low voltage when said controlled object is in said power saving state.

8. The information processing apparatus according to claim 7, wherein said control means sets said power supply voltage to 0 volts when said controlled object is in said power saving state.

9. The information processing apparatus according to claim 1, wherein said controlled object is a clock generating a frequency of a clock pulse for driving at least a portion of said apparatus and said control means sets said clock pulse frequency to a predetermined maximum value when said controlled object is in said non-power saving state and sets said clock pulse frequency to a predetermined value when said controlled object is in said power saving state.

10. The information processing apparatus according to claim 1, wherein said controlled object is a driving motor and said control means energizes said driving motor when said controlled object is in said non-power saving state and de-energizes said driving motor when said controlled object is in said power saving state.

11. The information processing apparatus according to claim 1, wherein said detecting means is a tablet incorporating a detector arrangement.

12. The information processing apparatus according to claim 11, wherein said control means sets said tablet in said power saving state when said detecting means detects that said user-associated medium has not at least approached at least a part of said tablet for at least a predetermined period of time, and sets said tablet in said non-power saving state so that said tablet can detect a coordinate when said detecting means detects that said user-associated medium at least approaches at least a part of said tablet.

13. The information processing apparatus according to claim 11, wherein said detecting means is an electromagnetic induction system tablet.

14. The information processing apparatus according to claim 11, wherein said detecting means is a capacitance system tablet and said user-associated medium is at least one of a stylus pen containing a conductive substance and a part of a user's body.

15. The information processing apparatus according to claim 11, wherein said detecting means is a capacitive coupling system tablet and said user-associated medium is at least one of a pen-shaped member that can write information and a part of a user's body.

16. The information processing apparatus according to claim 11, wherein said detecting means is a pressure-sensitive resistance system tablet and said user-associated medium is at least one of a pen-shaped member that can write information and a part of a user's body.

17. The information processing apparatus according to claim 11, wherein said detecting means is a transmission pen type ultrasonic system tablet and said user-associated medium is a stylus pen having an ultrasonic oscillation function.

18. The information processing apparatus according to claim 11, wherein said detecting means is a surface acoustic wave type ultrasonic system tablet and said user-associated medium is at least one of a part of a user's body and a stylus pen having a pen point made of a resilient material.

19. The information processing apparatus according to claim 11, wherein said detecting means is an optical system tablet and said user-associated medium is at least one of a pen-shaped member that can write information and a part of a user's body.

20. The information processing apparatus according to claim 11, wherein at least a part of said tablet has a laminated monolithic structure constituting a part of said housing.

21. The information processing apparatus according to claim 11, wherein a shape of said housing of said apparatus, an interface specification such as connectors, an attribute specification, an electrical specification, and a physical specification are based on a predetermined standard specification of an IC card.

22. The information processing apparatus according to claim 1, wherein said controlled object is a back light of a liquid crystal display panel, and said control means makes said back light bright when said controlled object is in said non-power sieving state and makes said back light dark when said controlled object is in said power saving state.

23. The information processing apparatus according to claim 1, wherein said controlled object is a back light of a liquid crystal display panel and said control means sets a power supply voltage supplied to said back light to a high voltage when said controlled object is in said non-power saving state, and sets the power supply voltage supplied to said back light to a low voltage when said controlled object is in said power saving state.

24. The information processing apparatus according to claim 1, wherein said controlled object is a back light of a liquid crystal display panel and said control means energizes said back light when said controlled object is in said non-power saving state and deenergizes said back light when said controlled object is in said power saving state.

25. The information processing apparatus according to claim 1, wherein said detecting means includes a television camera provided in said apparatus and detects at least an approach of said user-associated medium by utilizing image information from said television camera.

26. The information processing apparatus according to claim 1, wherein said detecting means includes two television cameras provided in said apparatus and detects at least an approach of said user-associated medium by utilizing a stereoscopy based on image informations from said two television cameras.

27. The information processing apparatus according to claim 1, wherein said detecting means includes a microphone provided in said apparatus and detects at least an approach of a sound of said user-associated medium by utilizing acoustic information from said microphone.

28. The information processing apparatus according to claim 1, wherein said detecting means includes a temperature sensor provided in said detecting means and detects at least an approach of said user-associated medium by utilizing a detected change of a temperature by said temperature sensor.

29. The information processing apparatus according to claim 1, wherein said detecting means includes a microphone provided in said apparatus and detects at least an approach of a particular user by a speaker identification based on a sound detected by said microphone.

* * * * *